United States Patent
Gomes et al.

(10) Patent No.: US 11,259,452 B2
(45) Date of Patent: Mar. 1, 2022

(54) UNITARY HOUSING

(71) Applicant: Mahindra and Mahindra Limited, Mumbai (IN)

(72) Inventors: Maxson Gomes, Mumbai (IN); Anil Hirgude, Mumbai (IN); Mahendra Jaware, Mumbai (IN); Savant Kedarnath, Mumbai (IN); Rajendra N. Yedekar, Mumbai (IN)

(73) Assignee: MAHINDRA AND MAHINDRA LIMITED, Mumbai (IN)

( * ) Notice: Subject to any disclaimer, the term of this patent is extended or adjusted under 35 U.S.C. 154(b) by 101 days.

(21) Appl. No.: 16/742,794

(22) Filed: Jan. 14, 2020

(65) Prior Publication Data

US 2020/0221626 A1    Jul. 16, 2020

(30) Foreign Application Priority Data

Jan. 14, 2019  (IN) .............................. 201921001600

(51) Int. Cl.
| | |
|---|---|
| *F15B 1/26* | (2006.01) |
| *A01B 59/00* | (2006.01) |
| *A01B 63/10* | (2006.01) |
| *B33Y 80/00* | (2015.01) |

(52) U.S. Cl.
CPC ............ *A01B 59/002* (2013.01); *A01B 63/10* (2013.01); *F15B 1/26* (2013.01); *B33Y 80/00* (2014.12); *F15B 2215/30* (2013.01)

(58) Field of Classification Search
CPC ...... F15B 1/26; F15B 2215/30; A01B 59/002; A01B 63/10
See application file for complete search history.

(56) References Cited

U.S. PATENT DOCUMENTS 8,641,074 B2 * 2/2014 Goedken ............ B62D 53/0842
280/438.1

* cited by examiner

*Primary Examiner* — Michael Leslie
*Assistant Examiner* — Daniel S Collins
(74) *Attorney, Agent, or Firm* — Lathrop GPM LLP

(57) ABSTRACT

A housing (100) for housing hydraulic components, wherein the hydraulic components are configured for operating a hitch mechanism of a tractor, is a single-body component that is configured to house a plurality of valve mechanism and a reciprocating piston therein. The housing (100) comprises cavities for locating valve mechanisms therein and a cylinder (110) for accommodating a reciprocating piston (210). The housing (100) together with a plurality of valve mechanisms (122, 124, 126, 128, 130, 132) disposed in corresponding cavities, forms a predetermined hydraulic circuit (1000). The hydraulic circuit (1000) has minimum number of leakage joints, minimizes number of components and therefore assembly and machining operations.

13 Claims, 13 Drawing Sheets

UNITARY HOUSING

FIELD

The present disclosure relates to hydraulic control components in a vehicle.

BACKGROUND

The background information herein below relates to the present disclosure but is not necessarily prior art.

A hydraulically-controlled three-point hitch mechanism of a vehicle such as a tractor requires a control valve housing, a powertrain and internal position control and draft control linkages. The control valve housing, through which the functions of system relief, compensation, unloading and the like are executed, is the most critical component of the hydraulic hitch control system.

Input to the hydraulic control valve housing is hydraulic flow and output thereof is hydraulic pressure to the powertrain of the three-point hitch mechanism, the output pressure being regulated by actuation of various valves contained in the hydraulic control valve housing. A piston-cylinder mechanism is the first component of the powertrain of the three-point hitch mechanism which receives hydraulic power from the hydraulic control valve housing.

Currently available hydraulic control valve housing is an assembly of a cylinder head and a valve body coupled with a cylinder, wherein the cylinder combines with a piston coupled with the rest of the powertrain of the three-point hitch mechanism. The primary issue with such an assembly of the hydraulic control valve housing is the creation of possible leakage joints between the mating faces, which worsen during high-pressure applications. Also, any minor error such as looseness in fixing the components of the hydraulic control valve housing together would lead to misalignment of critical components. In case of high pressure operation, the resultant high load on the piston may cause deflection of the cylinder and therefore misalignment at the joints, which is undesirable, since any deflection may lead to additional misalignment and therefore leakage and wear and tear of moving components such as the piston and the cylinder.

Hence, there is need of a hydraulic control valve housing which ameliorates the aforementioned issues.

OBJECTS

Some of the objects of the present disclosure, which at least one embodiment satisfies, are as follows:

A primary object of the present disclosure is to provide a hydraulic control valve housing for a hydraulic mechanism of a vehicle such as a tractor.

Another object of the present disclosure is to provide a hydraulic control valve housing for a hydraulic hitch mechanism of a vehicle.

Yet object of the present disclosure is to provide a hydraulic control valve housing for a hydraulic hitch mechanism of a vehicle, which eliminates leakage joints.

Still object of the present disclosure is to provide a hydraulic control valve housing for a hydraulic hitch mechanism of a vehicle, which prevents misalignment of moving components.

Other objects and advantages of the present disclosure will be more apparent from the following description, which is not intended to limit the scope of the present disclosure.

SUMMARY

The present disclosure envisages a unitary housing for housing components for operating a hitch mechanism of a vehicle such as a tractor. The unitary housing comprises cavities for placing a plurality of valve mechanisms therein and a cylinder for accommodating a reciprocating piston.

The unitary housing is provided with at least one inlet port in fluid communication with a pump, a plurality of channels and at least one outlet port in fluid communication with a sump.

In an embodiment, the unitary housing, together with a plurality of valve mechanisms disposed in the cavities in a one-to-one correspondence, forms a hydraulic circuit configured to operate a hitch mechanism of a vehicle.

In another embodiment, the plurality of valve mechanisms includes at least one of a main spool valve mechanism, a relief valve mechanism, an unloading valve mechanism, a compensator valve mechanism, a check valve mechanism and an isolator valve mechanism. In yet another embodiment, the check valve mechanism comprises a poppet, a ball, a poppet spring, a valve sleeve, a retainer, a retainer spring and a spacer. The spacer is hollow cylindrical in shape and is provided with at least one lateral through hole to allow passage of hydraulic fluid therethrough.

In still another embodiment, the housing is a casting, wherein the casting component comprises a cylindrical cavity corresponding to the cylinder. In yet another embodiment, the channels and the valve cavities are generated by performing a milling operation on the casting component. In still another embodiment, the housing is of cast iron.

In still another embodiment, the housing is manufactured using an additive manufacturing process selected from a group consisting of stereolithography, selective laser sintering, laser fusing, 3D printing, electron beam melting.

The present disclosure further envisages a hitch mechanism for a tractor. The hitch mechanism is provided with a unitary housing for housing hydraulic components. The unitary housing comprises cavities for placing a plurality of valve mechanisms therein, and a cylinder for accommodating a reciprocating piston.

In an embodiment, the unitary housing further comprises at least one inlet port in fluid communication with a pump, a plurality of channels, and at least one outlet port in fluid communication with a sump.

The present disclosure also envisages a tractor having a hitch mechanism, the hydraulic components of which are housed in a unitary housing. The unitary housing comprises cavities for placing a plurality of valve mechanisms therein, a cylinder for accommodating a reciprocating piston, at least one inlet port in fluid communication with a pump, a plurality of channels, and at least one outlet port in fluid communication with a sump.

BRIEF DESCRIPTION OF ACCOMPANYING DRAWING

FIG. 6b illustrates a front-isometric view of the unitary housing of FIG. 6a;

FIG. 7b illustrates a left-isometric view of the unitary housing of FIG. 7a;

FIG. 8a illustrates a sectional view of the unitary housing of FIG. 7a;

FIG. 8b illustrates another sectional view of the unitary housing of FIG. 7a;

FIG. 9a illustrates a yet another sectional view of the unitary housing of FIG. 7a;

FIG. 9b illustrates still another sectional view of the unitary housing of FIG. 7a;

FIG. 10 illustrates a yet another sectional view of the unitary housing of FIG. 7a;

FIG. 12a illustrates an isometric view of a solid representation of the hydraulic circuit formed by channels of the housing of FIG. 7a;

LIST OF REFERENCE NUMERALS

Figure 1:
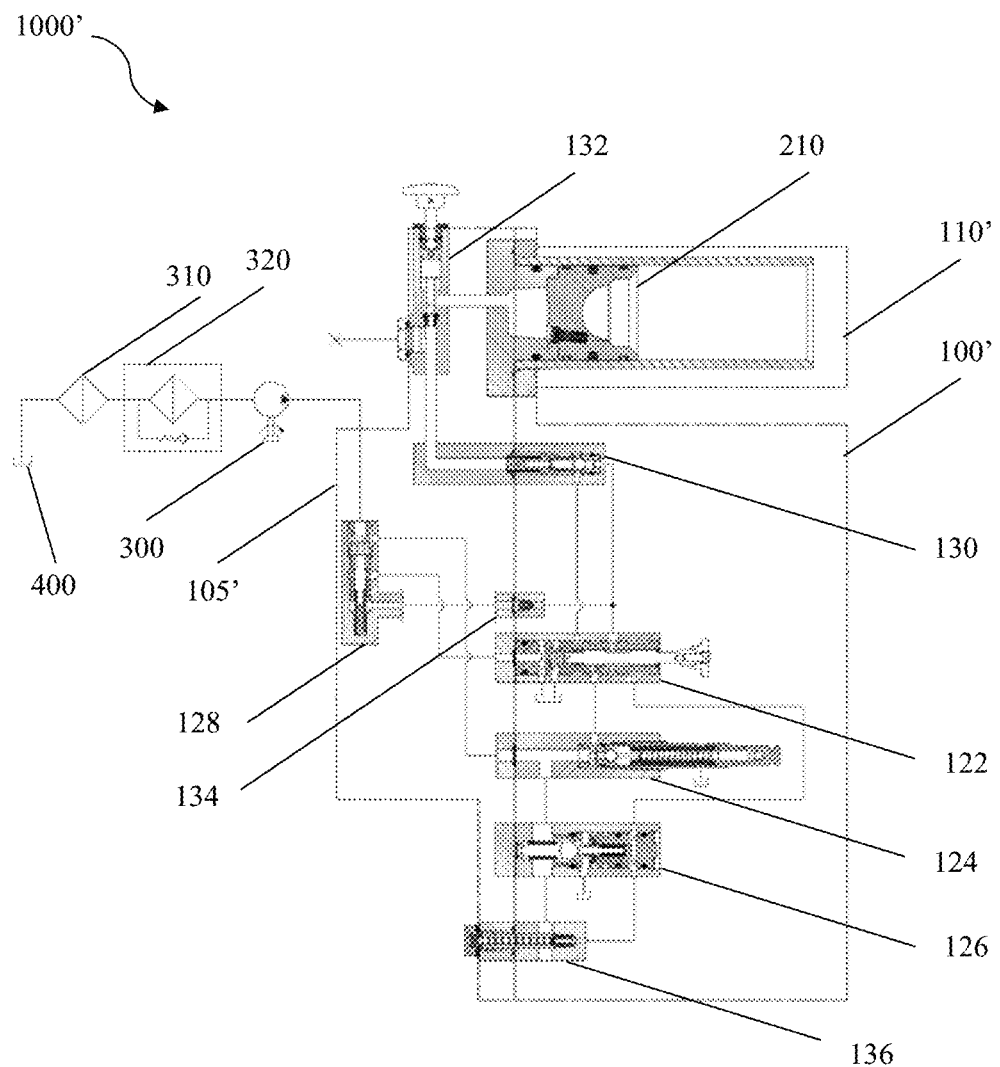
FIG. 1 illustrates a schematic diagram of a hydraulic control valve circuit of a first prior art.

1000' hydraulic control valve housing assembly of a first prior art
1000" hydraulic control valve housing assembly of a second prior art
100' valve housing of a first prior art
105' cylinder head of a first prior art
110' cylinder of a first prior art
100" valve housing of a second prior art
115" hydraulic housing of a second prior art
110" cylinder of a second prior art
1000 hydraulic control valve housing assembly of the present disclosure
100 housing of the present disclosure
110 cylindrical cavity
122 main spool valve
124 relief valve
126 unloading valve
128 compensator valve
130 check valve
1301 check valve poppet
1302 check valve ball
1303 check valve poppet spring
1304 check valve sleeve
1305 check valve retainer
1306 check valve retainer spring
1307 check valve spacer
1308 check valve plug
1309 check valve face seal
132 isolator valve
134 orifice
136 orifice filter
200 powertrain
210 piston
220 connecting rod
300 pump
310 strainer
320 filter
400 sump

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an" and "the" may be intended to include the plural forms as well, unless the context clearly suggests otherwise. The terms "comprises", "comprising", "including" and "having" are open-ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on", "engaged to", "connected to" or 'coupled to" another element, it may be directly on, engaged, connected or coupled to the other element. As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Terms such as "inner", "outer", "beneath", "below", "lower", "above", "upper" and the like, may be used in the present disclosure to describe relationships between different elements as depicted from the figures.

A hydraulic control system is usually employed for controlling actuation of a three-point hitch mechanism of a vehicle such as a tractor, which is used for raising and lowering of an equipment (e.g., a plough) attached to the top and the bottom links of the three-point hitch mechanism. A hydraulic control valve housing is a crucial component of the hydraulic control system. A control valve housing generally is an assembly of a cylinder head, a valve body and a cylinder which contains a piston, wherein the piston is coupled to the powertrain of the three-point hitch mechanism. Control of the three-point hitch mechanism is performed through hydraulic actuation of the piston by various valve mechanisms contained in the valve body and the cylinder head. A main spool valve holds or diverts hydraulic flow within the hydraulic system to lifting, lowering or tank ports as per its defined position by the operator of the vehicle. Besides a main spool valve mechanism, the hydraulic control system contains an unloading valve mechanism, a relief valve mechanism, a check valve mechanism, a compensator valve mechanism and an isolator valve mechanism, each disclosed within a corresponding cavity acting as the corresponding valve body. The check valve allows hydraulic flow in one direction only and holds the hydraulic flow in reverse direction. The compensator valve enables fixed throttling flow at varying outlet pressures. Thus, cylinder velocity is kept constant against variable pressures due to the compensator valve. The relief valve controls system pressure by limiting system pressure as per a set value. The unloading valve is a pressure-control device that is used to dump excess fluid to tank at little or no pressure. The isolator valve isolates flow to a given location to provide flow logic to internal or external of the hydraulic control circuit.

Figure 2A:
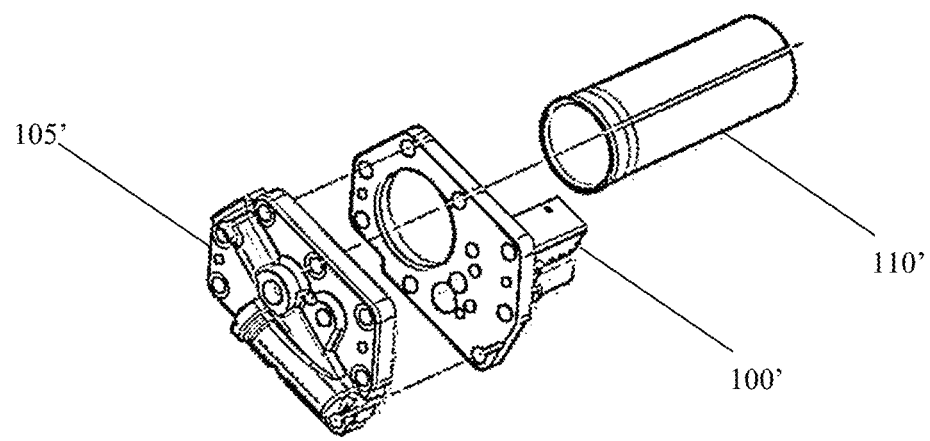
FIG. 2a illustrates an exploded view of a hydraulic control valve housing assembly of FIG. 1.
Figure 2B:
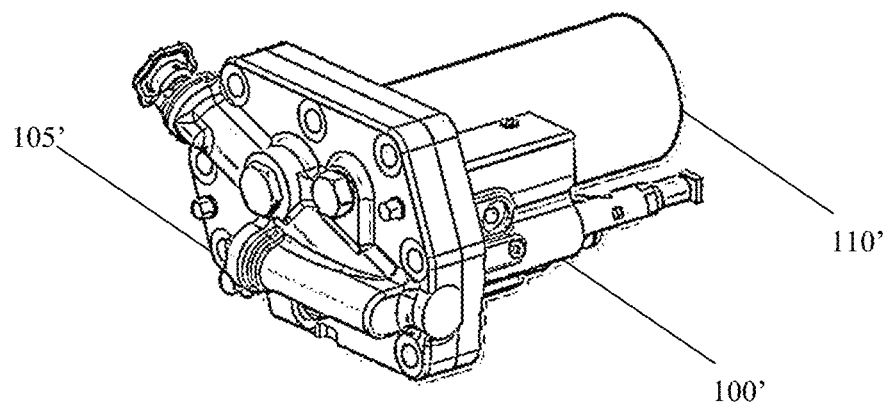
FIG. 2b illustrates a hydraulic control valve housing assembly of FIG. 1.
Figure 4A:
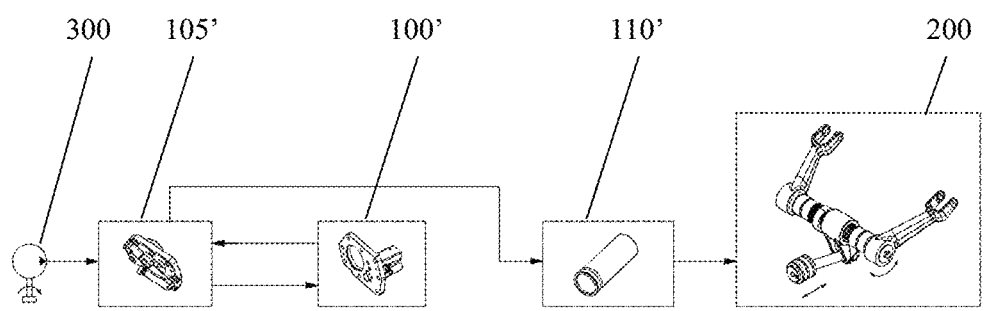
FIG. 4a illustrates a schematic diagram of fluid flow in a hydraulic control valve housing assembly of FIG. 1.

One such prior art (first) is illustrated in FIGS. 1 and 2. The schematic diagram of FIG. 1 shows a hydraulic control valve circuit 1000', wherein the main spool valve mechanism 122, the relief valve mechanism 124, the unloading valve mechanism 126 and the check valve mechanism 130 are disposed in the control valve housing 100', the compensator valve mechanism 128 and the isolator valve mechanism 132 are disposed in the cylinder head 105', and the cylinder 110' is attached to the control valve housing 100'. The exploded view of the control valve housing assembly is shown in FIG. 2a, and the assembled configuration of the control valve housing assembly is shown in FIG. 2b. FIG. 4a illustrates flow of fluid starting from the pump 300, through the cylinder head 105', the control valve housing 100' and the cylinder 110' in order to drive the powertrain 200, according to the first prior art.

Figure 3:
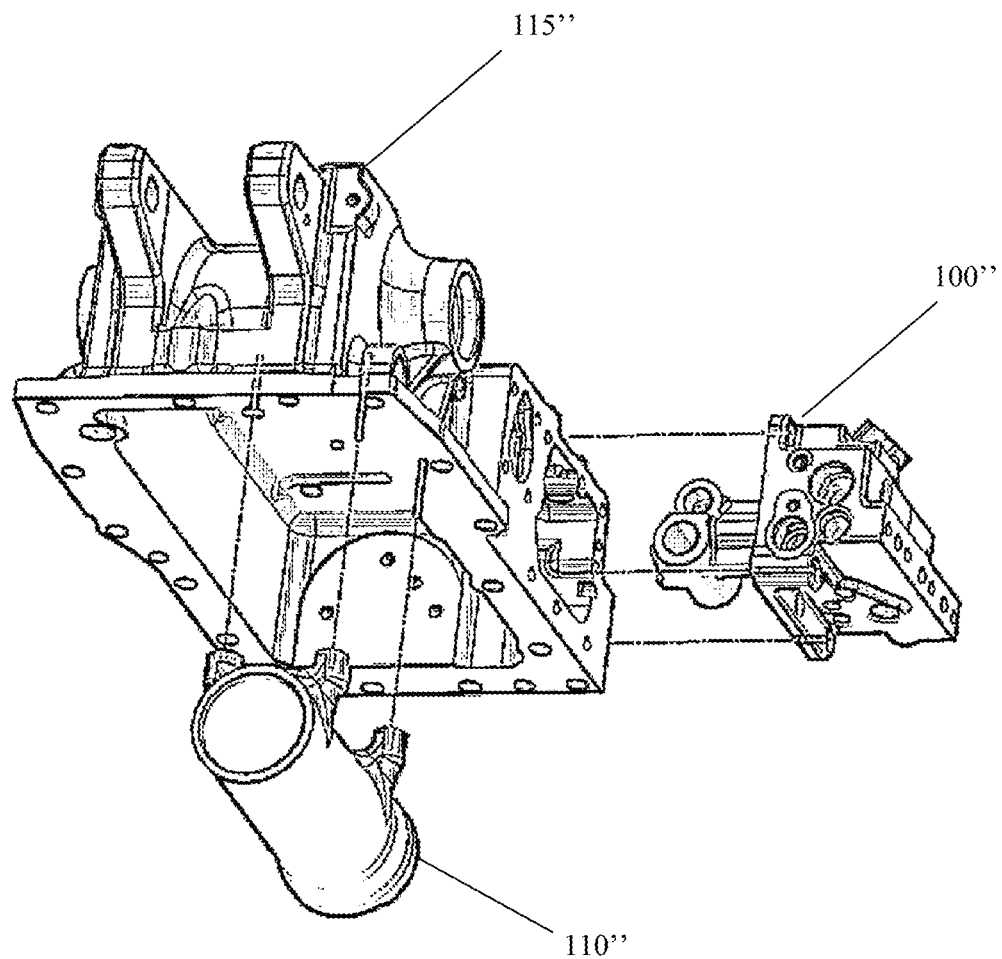
FIG. 3 illustrates a hydraulic control valve housing assembly of a second prior art.
Figure 4B:
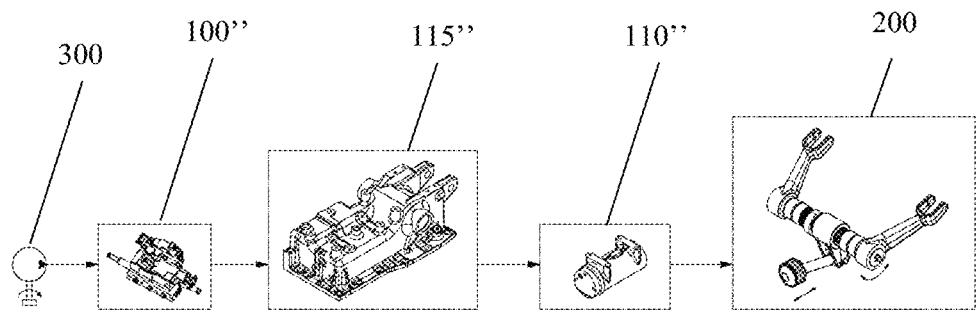
FIG. 4b illustrates a schematic diagram of the fluid flow in the hydraulic control valve housing assembly of FIG. 3.

Another prior art (second) is disclosed in FIG. 3. The exploded view of the control valve housing 100", the hydraulic housing 115" and the cylinder 110" is shown in FIG. 3. FIG. 4b illustrates flow of the fluid starting from the pump 300, through the control valve housing 100", the hydraulic housing 115" and the cylinder 110" in order to drive the powertrain 200, according to the second prior art.

The presence of multiple joining faces in these prior arts increases occurrence of leakage from these joints, as also misalignment between critical components, cylinder deflection due to high piston load and so on. All these issues need to be addressed by frequent servicing, which adds to the cost.

Figure 5:
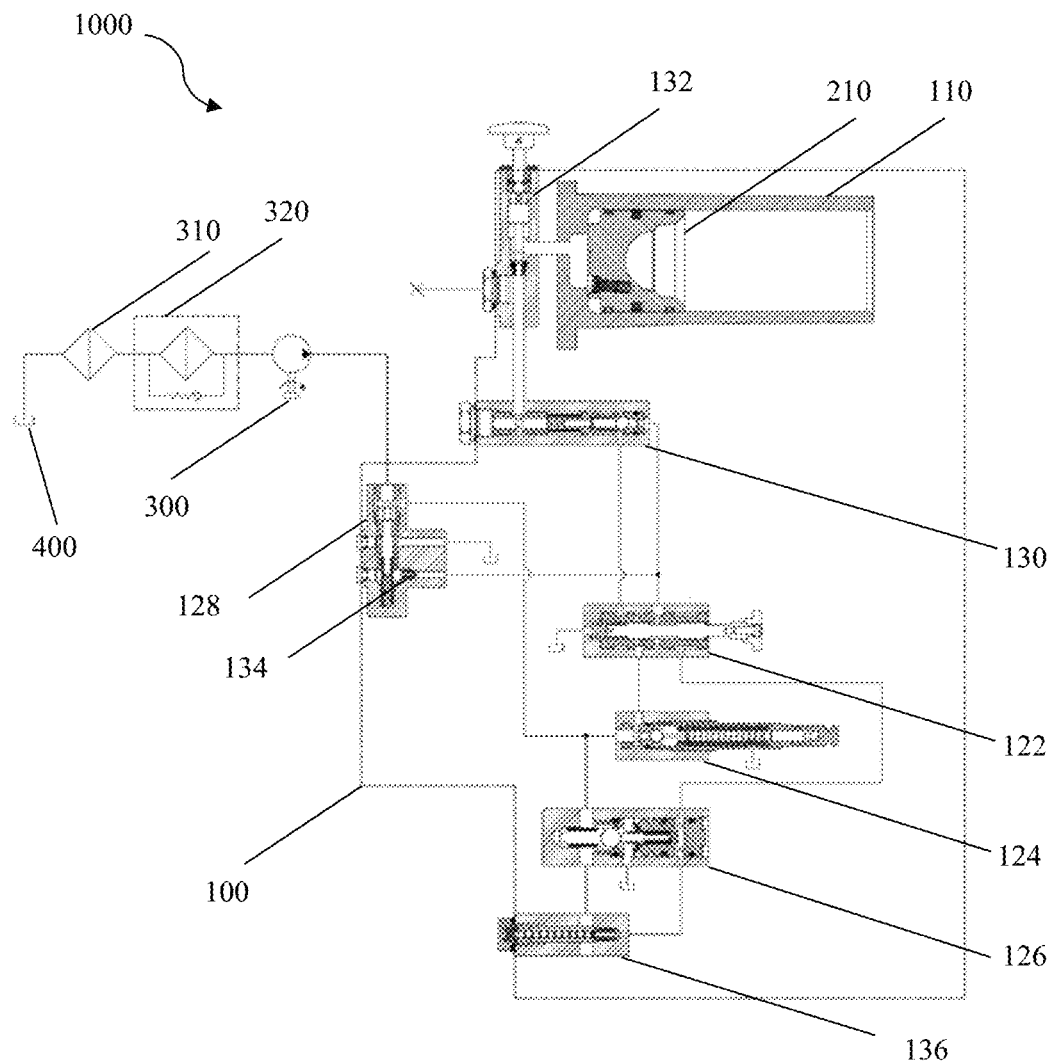
FIG. 5 illustrates a schematic diagram of the hydraulic control valve circuit of the present disclosure.
Figure 12A:
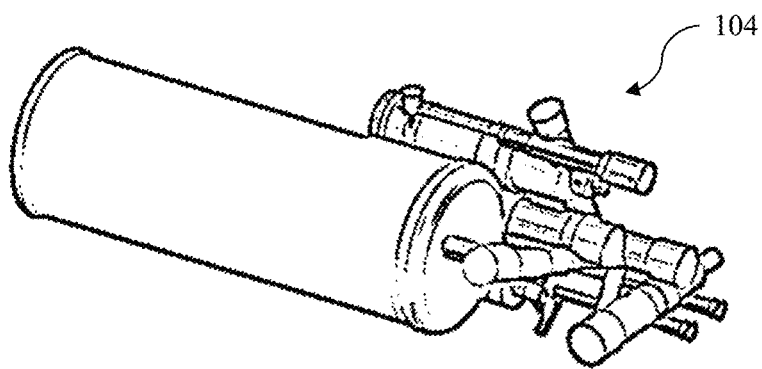
Figure 12B:
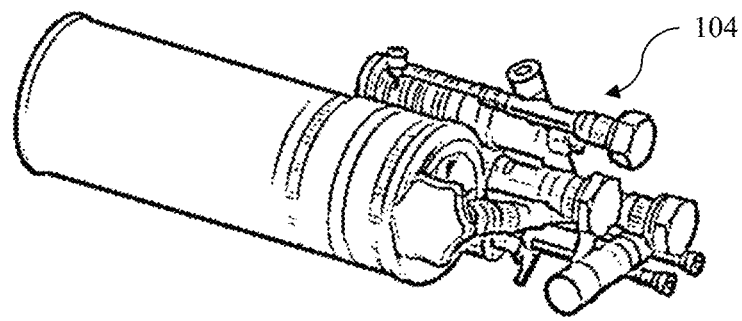
FIG. 12b illustrates a circuit of FIG. 12a with the valve mechanisms and plugs installed.

The present disclosure envisages a unitary housing 100 for housing components for operating a hitch mechanism of a vehicle such as a tractor, as illustrated in the schematic diagram of FIG. 5. The hydraulic circuit 1000 configured using these valves is illustrated in the schematic diagram of FIG. 5. The unitary housing 100 comprises cavities for locating valve mechanisms therein and a cylinder 110 for accommodating a reciprocating piston 110. The unitary housing 100 is in fluid communication with a hydraulic pump 300. Further, the unitary housing 100 is provided with at least one inlet port 102 (shown in FIG. 7b) in fluid communication with the pump 300, at least one outlet port 106 in fluid communication with a sump 400 (shown in cross-sectional views of the housing in FIGS. 8b, 9b), a plurality of valve cavities (not shown), a plurality of channels 104 (the various channels being shown in cross-sectional views in FIGS. 8a, 8b, 9a, 9b and 10) defining a predetermined hydraulic network (a solid representation of the hydraulic network of the various channels being shown in FIG. 12a) and a cylinder 110 which opens external to the unitary housing 100. The sump 400 is a reservoir of the oil for the hydraulic network of the present disclosure. The various control valve mechanisms are disposed within their corresponding valve cavities formed within the unitary housing 100. Together with the control valve mechanisms, the hydraulic network shown in FIG. 12a forms the hydraulic circuit shown in FIG. 12b. The piston 210 is slidingly disposed within the cylinder 110 and is configured to be coupled with the hitch mechanism.

In an embodiment, the plurality of valve mechanisms disposed within the unitary housing 100 includes a main spool valve mechanism 122, a relief valve mechanism 124, an unloading valve mechanism 126, a compensator valve mechanism 128, a check valve mechanism 130 and an isolator valve mechanism 132. The main spool valve 122 is actuated by the operator of the vehicle. The pump 300 is driven by either mechanical power of the vehicle's powertrain or by an independent battery-operated electric motor. The pump 300 draws hydraulic fluid from a sump 400 through a strainer 310 and a filter 320 installed at its inlet. The output of the pump 300 is connected to the inlet of the unitary housing 100. The pressurized fluid entering the unitary housing 100 at the inlet flows into the inlet of the compensator valve 132. One of the outlets of the compensator valve 128 is connected to the main spool valve 122 and the flow from the other outlet is branched to be connected to the relief valve 124 and the unloading valve 126. The unloading valve 126 is further connected to the main spool valve 122 and an orifice filter 136. The relief valve 124 is further connected to the main spool valve 122. The main spool valve 122 is further connected to the check valve 130. Fluid from the check valve 130 finally enters the cylindrical cavity 110 through the isolator valve 132.

Figure 6A:
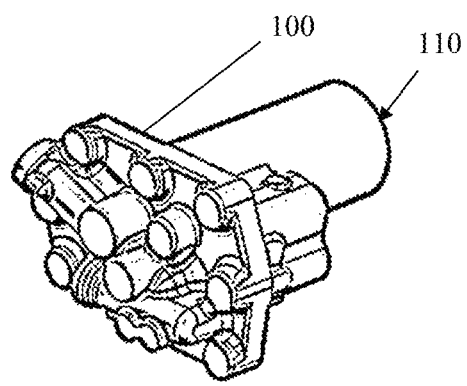
FIG. 6a illustrates a rear-isometric view of a unitary housing of an embodiment of the present disclosure in the pre-machined stage.
Figure 6B:
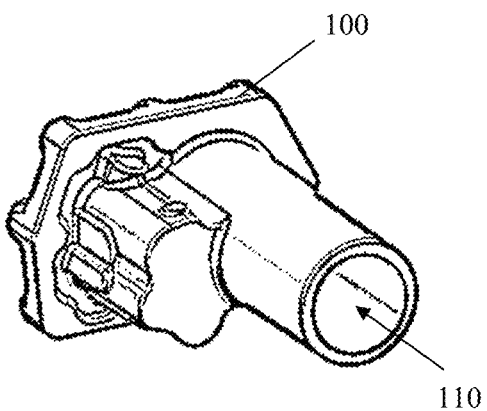
Figure 7A:
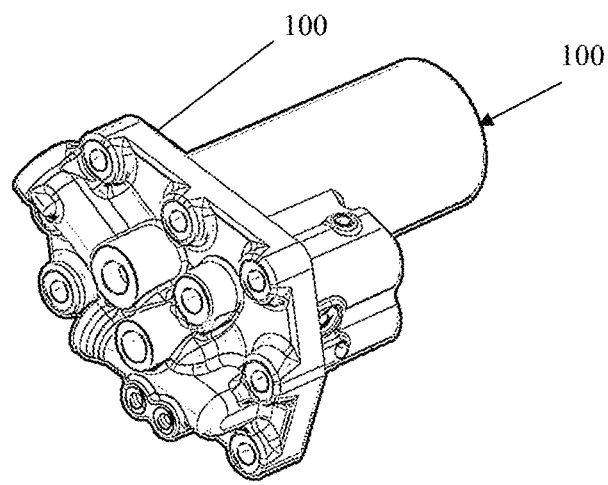
FIG. 7a illustrates the unitary housing of FIG. 6a in the post-machined stage.
Figure 7B:
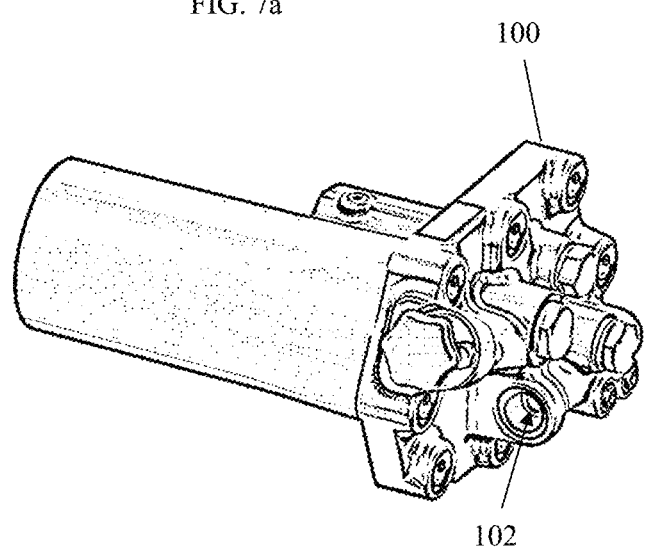

The unitary housing 100 is shown a pre-machined stage, as shown in FIGS. 6a, 6b. The unitary housing 100 is first prepared as a casting, made using conventional casting methods such as sand casting. The cylinder 110 is obtained by using a cylindrical core of approximately the same external diameter as the internal diameter of the cylinder 110. Rest of the casting is solid. The casting is made out of cast iron, although aluminium and ductile iron can also be used. The valve cavities for inserting the corresponding valve mechanisms and the various oil channels 104 are obtained by performing a suitable machining operation such as milling, using a machine such as a vertical machining centre (VMC), and at appropriate locations in the unitary housing 100. Further, close tolerances in diameter of the cavities and the various oil channels 104 are achieved using surface finishing methods selected from a group consisting of grinding, honing and the like. A post-machined stage of the unitary housing 100 is shown in FIG. 7a. After insertion of the valve mechanisms in the corresponding valve cavities, the openings are closed and sealed using means such as a plug and a face seal. The control valve assembly in a complete state is shown in FIG. 7b. In another embodiment, the unitary housing 100 is obtained using an additive manufacturing process selected from a group consisting of stereolithography, selective laser sintering, laser fusing, 3D printing, electron beam melting, and the like. With this method, the internal cavities and various oil channels 104 are also directly generated in the unitary housing 100. Close tolerances are further achieved using a method selected from a group consisting of grinding, honing and the like.

Figure 8A:
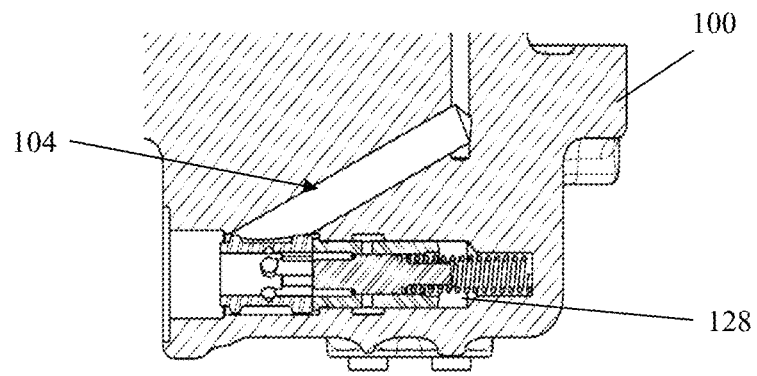
Figure 8B:
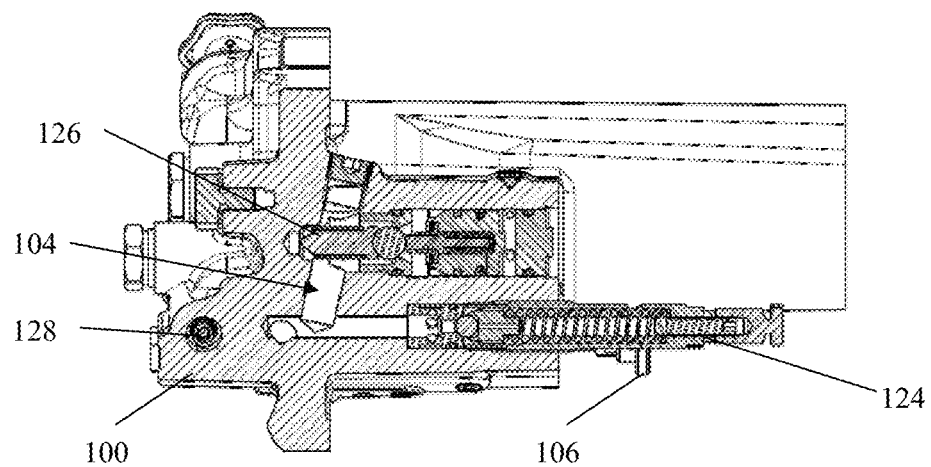
Figure 9A:
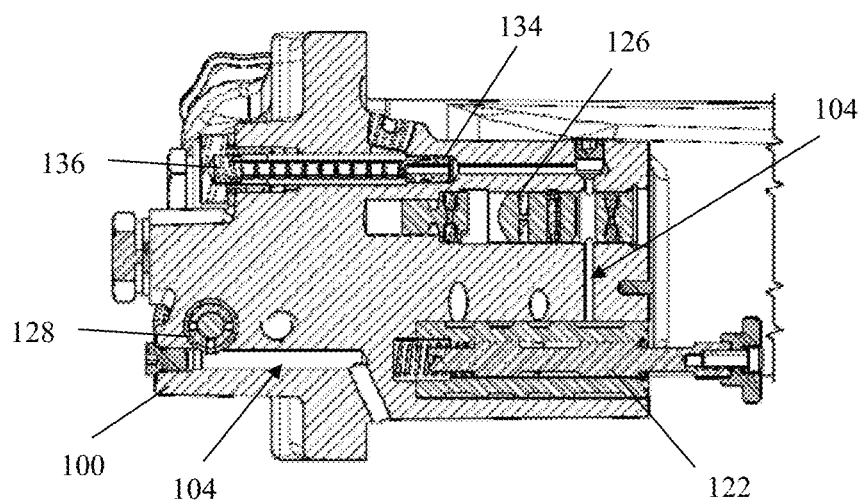
Figure 9B:
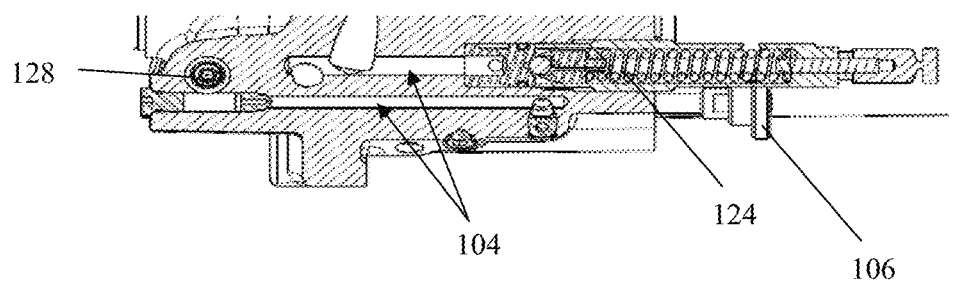
Figure 10:
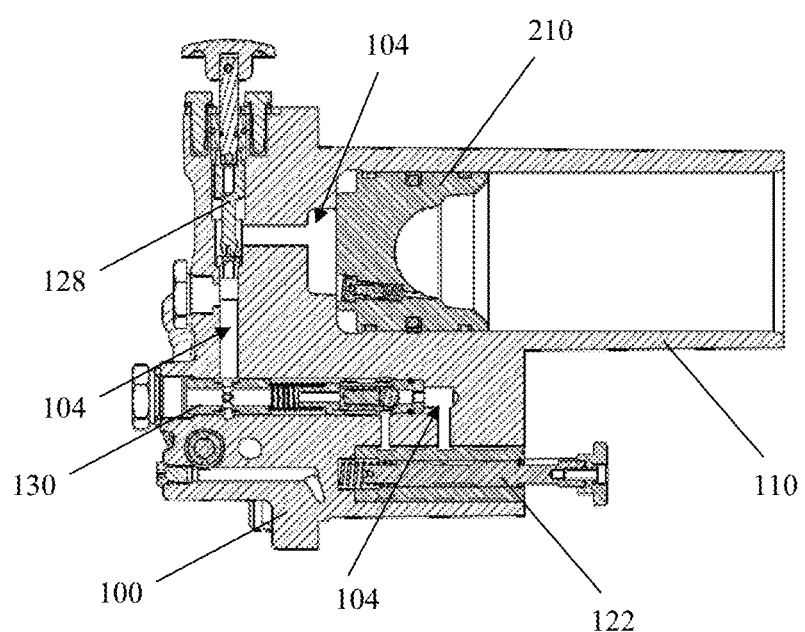

In the FIGS. 8a, 8b, 9a, 9b, 10, the various cross-sectional views of the unitary housing 100 are illustrated. FIG. 8a illustrates the portion of the hydraulic circuit 1000 around the compensator valve 128. FIG. 8b illustrates the portion of the hydraulic circuit around the relief valve 124 and the unloading valve 126. FIG. 9a illustrates the portion of the hydraulic circuit around the main spool valve 122, the valve unloading valve 126 and the orifice 134. FIG. 9b illustrates another portion of the hydraulic circuit around the relief valve 124. FIG. 10 illustrates the portion of the hydraulic circuit around the main spool valve 122, the compensator valve 128, the check valve 130 and the cylinder 110. Different segments of the hydraulic channels 104 are visible in each of FIGS. 8a, 8b, 9a, 9b, 10.

Figure 11:
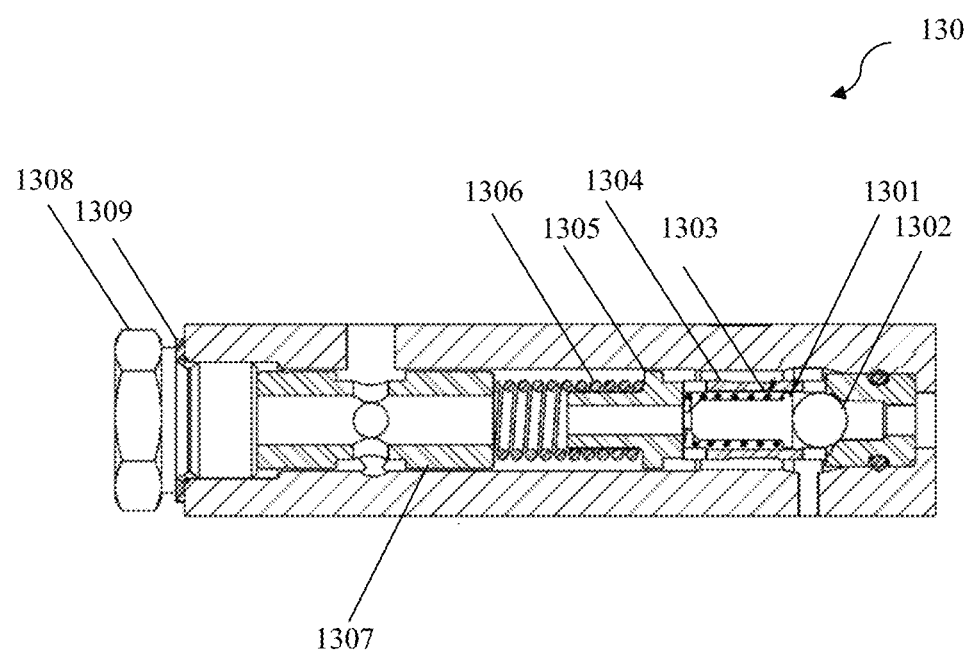
FIG. 11 illustrates a sectional view of a check valve of the present disclosure.

The check valve mechanism 130 as illustrated in FIG. 11 comprises a poppet 1301, a ball 1302, a poppet spring 1303, a valve sleeve 1304, a retainer 1305, a retainer spring 1306 and a spacer 1307. The retainer spring 1306 is used to maintain the position of the retainer 1305. The retainer 1305 keeps the poppet spring 1303 compressed. The spacer 1307 is hollow cylindrical in shape and is provided with at least one lateral through hole to allow passage of hydraulic fluid therethrough. Besides, the external opening provided in the unitary housing 100 for inserting the mechanism 130 is plugged and sealed using a plug 1308 and a face seal 1309. By providing the spacer 1307, an existing valve mechanism is accommodated in the unitary housing 100 of the present disclosure, without requiring adjustment of the compression value of the retainer spring 1306.

Figure 13:
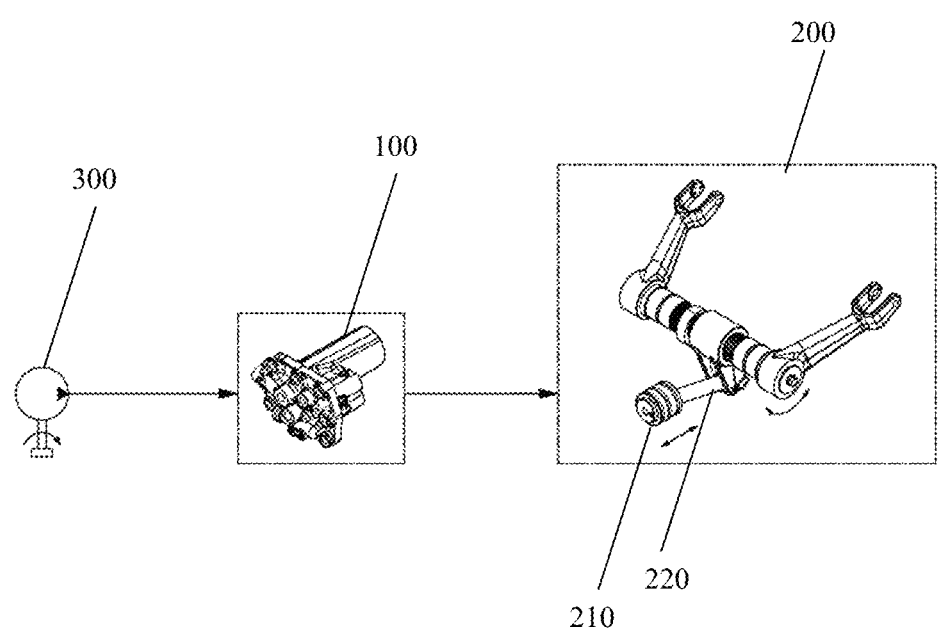
FIG. 13 illustrates a schematic diagram of fluid flow in the hydraulic control valve housing assembly of FIG. 6b.

The piston 210 is coupled to the arm of the sleeve of the powertrain 200 through a connecting rod 220, as shown in FIG. 13. The piston 210 is displaced due to hydraulic pressure of the fluid. The magnitude of pressure and direction of flow of the fluid is as governed by positions of the various valves in the housing 100. At the same time, position of valves like the unloading valve 126 is governed by back pressure received through the powertrain 200 due to increase in draft of the implement connected to the hitch mechanism. The power supplied to the powertrain 200 results in raising or lowering of the implement connected to the links of the hitch mechanism for draft control and position control.

The unitary housing 100 of the present disclosure as illustrated in FIG. 6b eliminates the various joints present in the aforementioned prior arts by integrating the valve housing 100', the cylinder head 105' and the cylinder 110' of the prior art into a unitary housing 100. The unitary housing 100 is made in the form a single cast, and the inlet, the outlet, the attachment holes, the valve openings and the like are provided by a suitable machining operation. The number of leakage points is minimized by eliminating the joints in the prior arts. Consequently, corresponding sealing elements required in the assembly are eliminated. Any increase in load on the piston 210 does not lead to deflection of the cylinder 110, since the cylinder 110 is integral to the unitary housing 100, resulting in increased component life. The control valve housing assembly of the prior art shown in FIG. 2a requires machining operation to be performed on the cylinder head 105', the valve housing 100' and the cylinder 110'. With lesser components involved in the assembly, the required number of assembly operations, testing operations and machining operations is minimized. Logistics and storage requirements are reduced due to the reduced part count.

The present disclosure further envisages a hitch mechanism for a tractor. The hitch mechanism is provided with a unitary housing (100) for housing hydraulic components. The unitary housing (100) comprises cavities for placing a plurality of valve mechanisms therein, and a cylinder (110) for accommodating a reciprocating piston (210).

In an embodiment, the unitary housing (100) further comprises at least one inlet port (102) in fluid communication with a pump (300), a plurality of channels (104), and at least one outlet port (106) in fluid communication with a sump (400).

The present disclosure also envisages a tractor having a hitch mechanism, the hydraulic components of which are housed in a unitary housing (100). The unitary housing (100) comprises cavities for placing a plurality of valve mechanisms therein, a cylinder (110) for accommodating a reciprocating piston (210), at least one inlet port (102) in fluid communication with a pump (300), a plurality of channels (104); and at least one outlet port (106) in fluid communication with a sump (400).

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of a housing for housing components for operating a hitch mechanism of a vehicle such as a tractor, which:

eliminates leakage joints and corresponding sealing elements;

prevents misalignment of moving components;

increases strength of the cylinder as it is integrated with the valve body;

eases servicing;

reduces part count; and reduces assembly, machining and testing operations.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A housing for housing hydraulic components, said components configured for operating a hitch mechanism of a vehicle, wherein said housing is a single-body component that is configured to house a plurality of valve mechanisms and a reciprocating piston therein, said housing comprising:
    cavities for placing the plurality of valve mechanisms therein; and
    a cylinder for accommodating the reciprocating piston.

2. The housing as claimed in claim 1, which is provided with:
    at least one inlet port in fluid communication with a pump;
    a plurality of channels; and
    at least one outlet port in fluid communication with a sump.

3. The housing as claimed in claim 2, wherein said housing, together with a plurality of valve mechanisms disposed in said cavities in a one-to-one correspondence, forms a hydraulic circuit configured to operate a hitch mechanism of a vehicle.

4. The housing as claimed in claim 1, wherein said plurality of valve mechanisms include at least one of:
    a main spool valve mechanism,
    a relief valve mechanism,
    an unloading valve mechanism,
    a compensator valve mechanism,
    a check valve mechanism, and
    an isolator valve mechanism.

5. The housing as claimed in claim 4, wherein said check valve mechanism comprises:
    a poppet;
    a ball;
    a poppet spring;
    a valve sleeve;
    a retainer;
    a retainer spring; and
    a spacer.

6. The housing as claimed in claim 5, wherein said spacer is hollow cylindrical in shape and is provided with at least one lateral through hole to allow passage of hydraulic fluid therethrough.

7. The housing as claimed in claim 1, wherein said housing is a casting component comprising a cylindrical cavity corresponding to the cylinder.

8. The housing as claimed in claim 7, wherein said channels and said valve cavities are generated by performing a milling operation on said casting component.

9. The housing as claimed in claim 1, wherein said housing is of cast iron, aluminium or ductile iron.

10. The housing as claimed in claim 1, wherein said housing is manufactured using an additive manufacturing process selected from a group consisting of stereolithography, selective laser sintering, laser fusing, 3D printing, electron beam melting.

11. A hitch mechanism for a tractor, said hitch mechanism provided with a single-body housing for housing all hydraulic components including a plurality of valve mechanisms and a reciprocating piston therein, said housing comprising:
    cavities for placing the plurality of valve mechanisms therein; and
    a cylinder for accommodating the reciprocating piston.

12. The hitch mechanism as claimed in claim 11, wherein said housing further comprises:
    at least one inlet port in fluid communication with a pump;
    a plurality of channels; and
    at least one outlet port in fluid communication with a sump.

13. A tractor having a hitch mechanism, the hydraulic components of which are housed in a single-body housing, said housing comprising:
    cavities for placing a plurality of valve mechanisms therein;
    a cylinder for accommodating a reciprocating piston;
    at least one inlet port in fluid communication with a pump;
    a plurality of channels; and
    at least one outlet port in fluid communication with a sump.

* * * * *